United States Patent
Mavridis et al.

(10) Patent No.: US 8,679,603 B1
(45) Date of Patent: Mar. 25, 2014

(54) HIGH CLARITY AND STRENGTH POLYETHYLENE FILMS

(71) Applicant: Equistar Chemicals, LP, Houston, TX (US)

(72) Inventors: Harilaos Mavridis, Lebanon, OH (US); Thomas J. Schwab, Loveland, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 13/724,684

(22) Filed: Dec. 21, 2012

(51) Int. Cl.
*B29C 65/00* (2006.01)

(52) U.S. Cl.
USPC ................................. 428/35.5; 525/240

(58) Field of Classification Search
USPC ........................................ 428/35.5; 525/240
See application file for complete search history.

(56) References Cited

U.S. PATENT DOCUMENTS

| 6,194,527 B1* | 2/2001 | Cribbs ........................... 526/75 |
| 6,870,010 B1* | 3/2005 | Lue et al. ........................ 525/240 |
| 2010/0209640 A1* | 8/2010 | Yun .............................. 428/35.7 |

* cited by examiner

Primary Examiner — N. Edwards

(57) ABSTRACT

An article that is made of a film a film having a narrow angle scattering (NAS) of greater than 40, a drop dart impact of greater than 100 grams, and a blocking of less than 40 g/16 in². In particular, the film in made of a blend of: (a) a LDPE, (b) a LLDPE produced with a single-site catalyst; and (c) one or more anti-block additives.

29 Claims, 2 Drawing Sheets

HIGH CLARITY AND STRENGTH POLYETHYLENE FILMS

FIELD OF THE INVENTION

The present disclosure relates to films having improved strength, clarity and blocking properties made from blends of a low density polyethylene and a linear low density polyethylene produced using a single-site catalyst. In particular, the films disclosed herein have exceptional properties for use in bags, food bags, bread bags, sandwich bags and zipper bags.

BACKGROUND OF THE INVENTION

Polyethylene films are used in a wide range of products and applications that generally fall into the categories of packaging and non-packaging. Packaging applications include food packaging, such as in-store produce bags and other containers for food; non-food packaging applications such as those for supported structures such as gaylord boxes, or those for containing various materials such as mulch bags, and other applications using stretch and shrink wrap films. Non-packaging applications include trash bags, can liners, construction film, such as vapor barriers in walls, and consumer products such as diapers.

Physical properties important in polyethylene films include tear strength, impact strength, tensile strength, stiffness and transparency. Overall film strength is desirable so that the films may be employed in applications without risk of physical failure. Transparency is an important property since it is desirable to have the flexibility to inspect items within a container without actually opening it. An additional property includes blocking, which refers to the ability or ease with which contacting film surfaces can be pulled apart.

Polyethylene films have been produced using different types of polymers to meet the demands of particular applications. Low density polyethylene (LDPE) and linear low density polyethylene (LLDPE) can be heat-sealed and have good barrier characteristics. In addition, LDPE particularly excels in applications demanding high clarity, ease of processing and high gloss. LLDPE is especially useful for applications requiring tensile and impact strength properties. However, blends of the two polyethylenes typically result in films with good optical properties but poor physical properties, particularly for thin films. Additionally, particular applications require appropriate blocking properties for use in the commercial setting. Ziegler-Natta-based LLDPE's can typically achieve clarity with the addition of LDPE, but at the expense of only modest strength levels, as evidenced, e.g., by dart impact measurements. Compositions containing metallocene-based LLDPE's blended with LDPE typically achieve high clarity levels, but at a severe loss of strength properties. It remains an industry unmet need for polyethylene films that combine both high clarity and high strength properties with acceptable blocking.

Various attempts have been made to combine the favorable optical properties of LDPE and good structural properties of LLDPEs. U.S. Publication No. 2006/0047077 discloses plastic films prepared by coextruding a blend of 1.5 to 4.5 wt % of a high pressure low density polyethylene having a melt index of 0.1 to 0.8 dg/min, and 95.5 to 98.5% of a linear low density polyethylene. U.S. Pat. No. 6,130,293 discloses a composition containing 1 to 3 wt % of an ethylene homopolymer having a melt index of about 1 to about 4 dg/min and 97 to 99 wt % of a linear ethylene-α-olefin copolymer. U.S. Pat. No. 5,455,303 discloses films made from a blend of a reactor-made material containing a linear low density polyethylene and a $C_3$-based material, with a low density polyethylene having a melt index of 0.2 to 20 dg/min. U.S. Pat. No. 6,870,010 discloses a low density, substantially linear polyethylene composition having a slice long chain branching index of 0.85 or less for any portion of the composition having a molecular weight of the 100,000 or above. U.S. Pat. No. 6,800,692 relates to polymer blends of metallocene-produced very low density polyethylene (VLDPE) having a density less than 0.916 $g/cm^3$ and LDPE.

Copending U.S. application Ser. No. 12/655,427, published as U.S. Publication No. 2011/0160403, relates to blends of and LLDPE produced with a Ziegler-Natta catalyst and an LDPE having a balance of optical and physical properties.

Copending U.S. application Ser. No. 13/022,268 relates to a film comprising an LDPE having an MI of 0.1 to 0.6 dg/min and LLDPE produced with a single-site catalyst comprising a metallocene wherein the film has improved haze, dart impact, and Machine direction (MD)-Tear. U.S. application Ser. No. 13/022,268 does not disclose blocking properties for use in bag, bread bag, food bag or zipper bag applications.

SUMMARY OF THE INVENTION

The present disclosure provides an article, a film, and a process for preparing the article and the film. In general embodiments, the article comprises a film having a narrow angle scattering (NAS) of greater than 40, a drop dart impact of greater than 100 grams, and a blocking of less than 40 $g/16\ in^2$. In particular embodiments, the LLDPE is made using a single-site catalyst. In alternate embodiments, the LLDPE is made using a metallocene catalyst.

In some embodiments, the film comprises a blend of: (a) from 0.05 to 1.5 wt % of an LDPE having an MI of 0.1 to 0.6 dg/min; (b) from 98.5. to 99.95 wt % of an LLDPE produced with a single-site catalyst comprising a metallocene; and (c) from 0.05 to 1 wt % one or more anti-block additives, wherein the weight percentages are based on 100 parts of (a) and (b). In some embodiments, the LDPE is present in an amount from 0.15 to 0.8 wt % and LLDPE is present in an amount from 99.85 to 99.2 wt % based on 100 parts of (a) and (b). In additional embodiments, the LLDPE has a density of from 0.912 $g/cm^3$ to 0.922 $g/cm^3$. In additional embodiments, the film has a haze of about 12% or less. In further embodiments, the film has a 1% secant (MD) greater than 25,000 psi. In specific embodiments, the blend comprises from 0.4 to 0.5 wt % of said one or more antiblocking agents based on 100 parts of (a) and (b). In additional embodiments, the polymer blend comprises from 0.01 to 0.5 wt % of one or more slip agents based on 100 parts of (a) and (b).

In particular embodiments, the LLDPE has a slice long chain branching index of at least 0.90 for any portion of the composition having a molecular weight of 100,000 or above. In some embodiments, the LLDPE is a copolymer of ethylene and 1-butene or 1-hexene. In some embodiments, the LLDPE has a density of 0.922 $g/cm^3$ to 0.927 $g/cm^3$. In general embodiments, the LLDPE has a 1% secant modulus (MD) greater than 35,000 psi.

In specific embodiments, the LDPE has an MI is 0.1 to 0.4 dg/min.

In general embodiments, the film has a thickness of from about 0.7 to 1.70 mil.

In additional embodiments, the film has a thickness of less than 1 mil. In general embodiments, the film is produced by a blown film process.

In some embodiments, the article has a plurality of layers. In those embodiments, more than one film present. In some embodiments, a first film and a second film forms a least one pair of adjacent contacting surface layers of the article.

In additional embodiments, the article is formed into a bag. In those embodiments, the film has a thickness of from about 0.7 to 1.70 mil. In further embodiments, the article is formed into a zipper bag. In those embodiments, the film has a thickness of from about 1.50 mil to 2.50 mil.

In general, the present invention provides a process for preparing a film having a narrow angle scattering (NAS) of greater than 40, a drop dart impact of greater than 100 grams, and a blocking of less than 40 g/16 in$^2$ comprising the steps of: (1) preparing a blend comprising: (a) from 0.05 to 1.5 wt % of an LDPE having an MI of 0.1 to 0.6 dg/min; (b) from 98.5. to 99.95 wt % of an LLDPE produced with a single-site catalyst comprising a metallocene; and (c) from 0.05 to 1 wt % one or more anti-block additives, wherein the weight percentages are based on 100 parts of (a) and (b); and (2) forming said blend into a film.

In some embodiments, the LLDPE has a slice long chain branching index of at least 0.90 for any portion of the composition having a molecular weight of 100,000 or above. In further embodiments, the process further comprises the step of forming the film into a bag.

In some embodiments, the LLDPE has a density of from 0.912 g/cm$^3$ to 9.27 g/cm$^3$. In additional embodiments, the LLDPE has a density of from 0.912 g/cm$^3$ to 0.922 g/cm$^3$. In other embodiments, the LLDPE has a density of 0.922 g/cm$^3$ to 0.927 g/cm$^3$.

In some embodiments, the film has a secant modulus in the machine direction greater than 35,000 psi. In some embodiments, the film has a thickness of from 1.50 mil to 2.50 mil. In particular embodiments, the film has a thickness of 0.75 mil.

In general embodiments, the article may be a film, an article comprising at least one film, a bag, a bread bag, a sandwich bags, a food bag or a zipper bag.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purpose of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description which considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing.

DETAILED DESCRIPTION OF THE INVENTION

Figure 1:
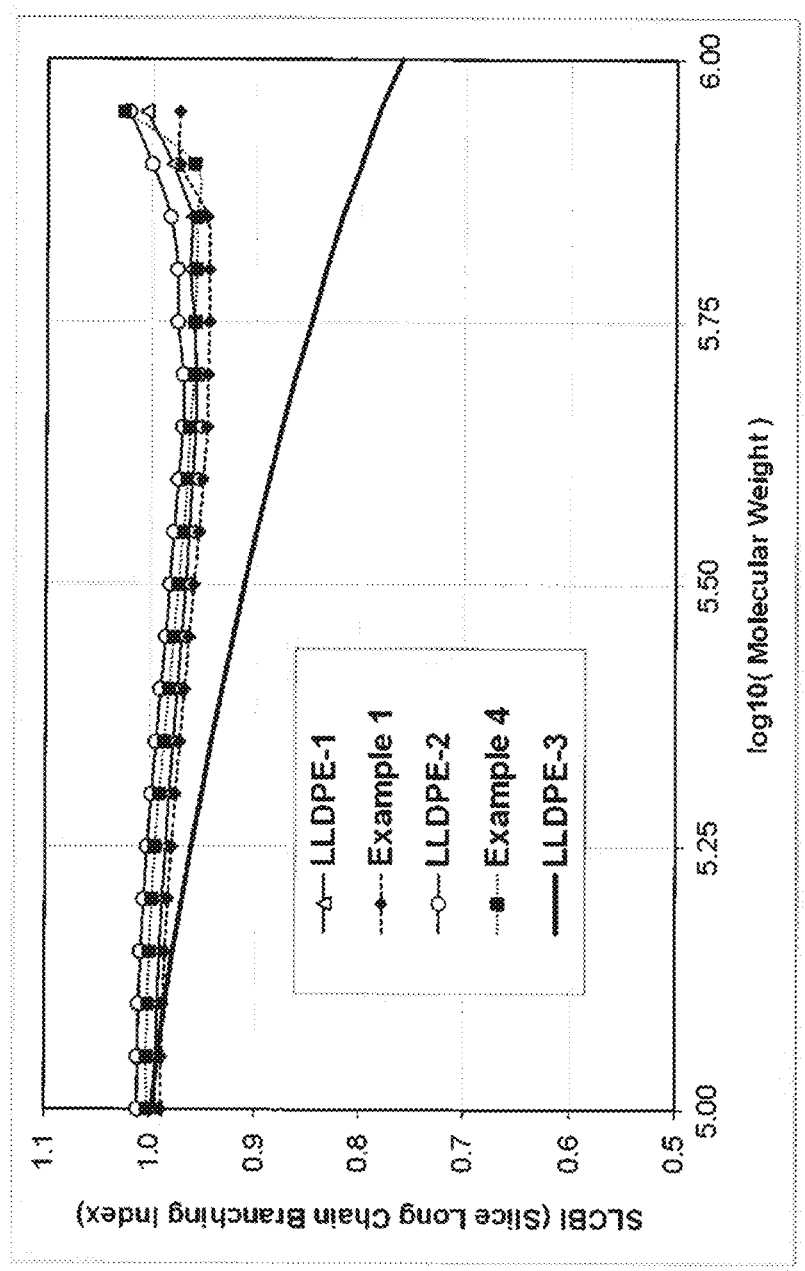
FIG. 1 shows a graph that illustrates the Slice Long Chain Branching Index as a function of log10 (Molecular Weight).

It has unexpectedly been found that films formed from a blend of a linear low density polyethylene produced with a single-site catalyst, particularly a metallocene-based catalyst, and very low levels of a low density polyethylene provides acceptable blocking properties with significantly improved clarity and haze and minimal adverse effect on impact properties, thus forming films having exceptional properties for use in bags, food bags, bread bags, sandwich bags and zipper bag applications.

In the early 1980's, Kaminsky discovered a new class of olefin polymerization catalysts known as metallocenes (see U.S. Pat. Nos. 4,404,344 and 4,431,788). A metallocene catalyst consists of a transition metal compound that has one or more cyclopentadienyl (Cp) ligands. Unlike Ziegler catalysts, metallocene catalysts are usually soluble in olefins or polymerization solvents and give homogeneous polymerization systems. Since these catalysts have a single reactive site (compared with multiple reactive sites of Ziegler catalysts), they are also called "single-site" catalysts. Metallocene catalysts are more reactive than conventional Ziegler catalysts, and they produce polymers with narrower molecular weight distributions. In general, single-site catalysts enhance incorporation of long chain α-olefin comonomers into polyethylene.

The novelty of metallocene versus classical Ziegler-Natta catalyst derived polymers is best summarized in the word "single site catalyst." This means that the active catalytic sites in the molecular zirconocene species are almost identical, whereas classical Ziegler-Natta catalysts are heterogeneous not just by the phase (as solid-state catalysts) but also by their composition in having active sites with different environments at corners and edges of the solid surface. Ziegler-Natta catalysts have several chemically different active sites. This leads to less uniform polymers, i.e., a higher molar mass, composition, and tacticity distribution. Metallocene catalysts have essentially a single type of active metal site. This gives a "single," more uniform type of polymer chain, i.e., lower molar mass, more uniform composition (e.g., branching, comonomer content), and tacticity distribution.

A key feature of metallocene-catalyzed polymers that differs from conventional polyolefins is structural uniformity. This feature (a) eliminates very low and very high molar mass polymer fractions present with Ziegler-Natta catalyst, (b) leads to uniform amounts of comonomers and their statistical distribution, and (c) results in a narrow tacticity distribution.

By taking advantage of the structural and mechanical features of polymers produced using a single-site catalyst, a blend of a linear low density polyethylene produced with a single-site catalyst, particularly a metallocene-based catalyst, and very low levels of a low density polyethylene was produced having excellent blocking properties with significantly improved clarity and haze in comparison with other blends.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "mil" as used herein equals 0.001 inch.

The term "haze" as used herein refers to the percentage of transmitted light that in passing through the polymer deviates from the incident beam by forward scattering. In some commercial hazemeters only light deviating more than 2.5° from the transmitted beam direction is considered haze. In general, the effect of haze is to impart a cloudy or milky appearance to the sample, but its transparency need not be reduced. Transparency is defined as the sate permitting perception of objects through or beyond the specimen. For example, a sample of low transparency may not exhibit haze, but objects seen through it will appear blurred or distorted.

The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety. For the referenced ASTM standards, visit the ASTM website, www.astm.org, or contact ASTM Customer Service at service@astm.org.

The term "ASTM D 1746" as used herein refers to the standard test method for determining transparency of plastic sheeting. The attribute of clarity of a sheet, measured by its ability to transmit image-forming light, correlates with its regular transmittance. Sensitivity to differences improves with decreasing incident beam- and receptor-angle. If the angular width of the incident beam and of the receptor aperture (as seen from the specimen position) are of the order of 0.1° or less, sheeting of commercial interest have a range of transparency of about 10 to 90% as measured by this test. Results obtained by the use of this test method are greatly influenced by the design parameters of the instruments; for example, the resolution is largely determined by the angular width of the receptor aperture. Caution should therefore be exercised in comparing results obtained from different instruments, especially for samples with low regular transmittance. Regular transmittance data in accordance with this test method correlate with the property commonly known as "see-through," which is rated subjectively by the effect of a hand-held specimen on an observer's ability to distinguish clearly a relatively distant target. This correlation is poor for highly diffusing materials because of interference of scattered light in the visual test. This test method was approved on Feb. 1, 2009 and published March 2009, the contents of which are incorporated herein by reference in its entirety. For the referenced ASTM standards, visit the ASTM website, www.astm.org, or contact ASTM Customer Service at service@astm.org.

The term "ASTM D 1709" as used herein refers to the standard test method for determining the impact resistance of plastic film by the free-falling dart method. In general, ASTM D 1709 describes two test methods. These test methods cover the determination of the energy that causes plastic film to fail under specified conditions of impact of a free-falling dart. This energy is expressed in terms of the weight (mass) of the missile falling from a specified height which would result in 50% failure of specimens tested. Test Method A employs a dart with a 38.10±0.13-mm (1.500±0.005-in.) diameter hemispherical head dropped from a height of 0.66±0.01 m (26.0±0.4 in.). This test method may be used for films whose impact resistances require masses of about 50 g or less to about 2 kg to fracture them. Test Method B employs a dart with a 50.80±0.13-mm (2.000±0.005-in.) diameter hemispherical head dropped from a height of 1.50±0.03 m (60.0+ 0.25, −1.70 in.). Its range of applicability is from about 0.3 kg to about 2 kg. The standard technique is the staircase method. By this technique, a uniform missile weight increment is employed during test and the missile weight is decreased or increased by the uniform increment after test of each specimen, depending upon the result (fail or not fail) observed for the specimen. The alternative technique provides for testing specimens in successive groups of ten. One missile weight is employed for each group and missile weight is varied in uniform increments from group to group. The staircase technique and the alternative technique give equivalent results both as to the values of impact failure weight which are obtained and as to the precisions with which they are determined. It is worth noting that the results of the two methods may not be correlated. This test method was approved on May 1, 2009 and published June 2009, the contents of which are incorporated herein by reference in its entirety. For the referenced ASTM standards, visit the ASTM website, www.astm.org, or contact ASTM Customer Service at service@astm.org.

The term "ASTM D 3354" as used herein refers to the standard test method for determining the blocking load of plastic film by the parallel plate method. In general, this test method yields quantitative information regarding the degree of blocking (unwanted adhesion) existing between layers of plastic film. It is not intended to measure susceptibility to blocking. By this procedure, the film-to-film adhesion, expressed as a blocking load in grams, will cause two layers of film with an area of contact of 100 cm2 to separate. The test method is limited to a maximum load of 200 grams. According to this method, two pieces of film, which are in contact with each other, are placed between two 100-mm (4-in.) square blocks. The ends of the films that extend past the blocks are secured to the respective upper and lower block. The force required to overcome the adhesion (blocking force) between the two pieces of film or until they reach 1.9 cm of separation is measured in grams using a constant-rate-of-load or a constant-rate-of-separation device. Blocking develops in film processing and storage when layers of smooth film are in intimate contact with nearly complete exclusion of air. Temperature, or pressure, or both, can induce or change the degree of adhesion of the surfaces. This test method was approved on May 1, 2011 and published May 2011, the contents of which are incorporated herein by reference in its entirety. For the referenced ASTM standards, visit the ASTM website, www.astm.org, or contact ASTM Customer Service at service@astm.org.

The term "ASTM E111" as used herein refers to the standard test method for determining the Young's Modulus, tangent modulus and chord modulus. According to this method, a uniaxial force is applied to the test specimen and the force and strain are measured, either incrementally or continuously. The axial stress is determined by dividing the indicated force by the specimen's original cross-sectional area. The appropriate slope is then calculated from the stress-strain curve, which may be derived under conditions of either increasing or decreasing forces (increasing from preload to maximum applied force or decreasing from maximum applied force to preload). This test method was approved on Sep. 15, 2010 and published January 2011, the contents of which are incorporated herein by reference in its entirety. For the referenced ASTM standards, visit the ASTM website, www.astm.org, or contact ASTM Customer Service at service@astm.org.

The term "ASTM D 1003" as used herein refers to the standard test method for determining the haze and luminous transmittance of transparent plastics. In general, this test method covers the evaluation of specific light-transmitting and wide-angle-light-scattering properties of planar sections of materials such as essentially transparent plastic. Light that is scattered upon passing through a film or sheet of a material can produce a hazy or smoky field when objects are viewed through the material. Another effect can be veiling glare, as occurs in an automobile windshield when driving into the sun. According to this method, the haze measurements are made with either a hazemeter or a spectrophotometer. This test method was approved on Apr. 15, 2011 and published April 2011, the contents of which are incorporated herein by reference in its entirety. For the referenced ASTM standards, visit the ASTM website, www.astm.org, or contact ASTM Customer Service at service@astm.org.

The term "ASTM D 882" as used herein refers to the standard test method for determining the tensile properties of thin plastic sheeting. In general, this test method covers the determination of tensile properties of plastics in the form of thin sheeting and films (less than 1.0 mm (0.04 in.) in thickness). The tensile modulus of elasticity is an index of the stiffness of thin plastic sheeting. Tensile properties can vary with specimen thickness, method of preparation, speed of testing, type of grips used, and manner of measuring extension. Consequently, where precise comparative results are desired, these factors must be carefully controlled. This test method was approved on Aug. 1, 2012 and published September 2012, the contents of which are incorporated herein by reference in its entirety. For the referenced ASTM standards, visit the ASTM website, www.astm.org, or contact ASTM Customer Service at service@astm.org.

The term "ASTM D 1992" as used herein refers to the standard test method for testing synthetic plasticizers used in rubber. In general, this test method provides direction regarding, sampling, testing volatility, moisture, acid number, saponification number, color, specific gravity, viscosity, refractive index, titrimetric analysis, gas chromatography analysis, infrared analysis, and flammability. This test method was approved on May 1, 2012 and published May 2012, the contents of which are incorporated herein by reference in its entirety. For the referenced ASTM standards, visit the ASTM website, www.astm.org, or contact ASTM Customer Service at service@astm.org.

The term "ASTM D 2457" as used herein refers to the standard test method for determining specular gloss of plastic films and solid plastics. In general, this test method describes procedures for the measurement of gloss of plastic films and solid plastics, both opaque and transparent. Specular gloss is used primarily as a measure of the shiny appearance of films and surfaces. Precise comparisons of gloss values are meaningful only when they refer to the same measurement procedure and same general type of material. In particular, gloss values for transparent films should not be compared with those for opaque films, and vice versa. Gloss is a complex attribute of a surface which cannot be completely measured by any single number. Specular gloss usually varies with surface smoothness and flatness. It is sometimes used for comparative measurements of these surface properties. In general, the instrument used in this method shall consist of an incandescent light source furnishing an incident beam, means for locating the surface of the test specimen, and a receptor located to receive the required pyramid of rays reflected by the specimen. The receptor shall be a photosensitive device responding to visible radiation. This test method was approved on Mar. 1, 2008 and published March 2008, the contents of which are incorporated herein by reference in its entirety. For the referenced ASTM standards, visit the ASTM website, www.astm.org, or contact ASTM Customer Service at service@astm.org.

The term "ASTM D 1894" as used herein refers to the standard test method for determining static and kinetic coefficients of friction of plastic film and sheeting. In general, this test method covers determination of the coefficients of starting and sliding friction of plastic film and sheeting when sliding over itself or other substances at specified test conditions. For example, measurements of frictional properties may be made on a film or sheeting specimen when sliding over itself or over another substance. The procedure permits the use of a stationary sled with a moving plane, or a moving sled with a stationary plane. Both procedures yield the same coefficients of friction values for a given sample. This test method was approved on Sep. 1, 2011 and published September 2011, the contents of which are incorporated herein by reference in its entirety. For the referenced ASTM standards, visit the ASTM website, www.astm.org, or contact ASTM Customer Service at service@astm.org.

The term "ASTM D 1505" as used herein refers to the standard test method for determining density of plastics by the density-gradient technique. In general, this test method is based on observing the level to which a test specimen sinks in a liquid column exhibiting a density gradient, in comparison with standards of known density. This test method was approved on Jul. 1, 2010 and published September 2010, the contents of which are incorporated herein by reference in its entirety. For the referenced ASTM standards, visit the ASTM website, www.astm.org, or contact ASTM Customer Service at service@astm.org.

The term "ASTM D 5630" as used herein refers to the standard test method for determining ash content in plastics. In general, this test method is based on a loss in weight of a sample when combusted to oxidize all organic matter. This test is useful in determining the presence of inorganic residues found in a sample. Inorganic residues from plastics ashing may be antiblock, fillers, reinforcements, catalyst residues, colorants, etc. The quantitative amounts of each are important variables of the manufacturing process. This test method was approved on Sep. 1, 2006 and published October 2006, the contents of which are incorporated herein by reference in its entirety. For the referenced ASTM standards, visit the ASTM website, www.astm.org, or contact ASTM Customer Service at service@astm.org.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Low Density Polyethylene (LDPE)

As used herein, the term "LDPE" refers to low density polyethylene, which is a polyethylene with a high degree of branching with long chains. Often, the density of a LDPE will range from 0.910-0.940 g/cm$^3$. In general, LDPE is created by free radical polymerization.

The LDPE component for the films disclosed herein has a melt index (MI) of 0.1 to 0.6 dg/min and preferably from 0.1 to 0.4 dg/min, and is measured by ASTM D 1238, condition 190/2.16. Additionally, the LDPE has a density of 0.910 to 0.940 g/cm$^3$, more preferably from 0.915 to 0.935 g/cm$^3$, and still more preferably from 0.915 to 0.925 g/cm$^3$.

Suitable LDPE's can be produced using conventional methods, for example by either a tubular or autoclave high-pressure polymerization process utilizing air or peroxide initiators. Suitable LDPE's are commercially available from Equistar Chemicals, LP, trade name Petrothene® NA942000.

Linear Low Density Polyethylene (LLDPE)

As used herein, the term "LLDPE" refers to linear low density polyethylene, which is a polyethylene with significant numbers of short branches resulting from copolymerization of ethylene with at least one $C_{3-12}$ α-olefin comonomer, e.g., butene, hexene or octene. Typically, LLDPE has a density in the range of 0.912 to 0.927 g/cm$^3$. In many cases, the LLDPE is an ethylene hexene copolymer, ethylene octene copolymer or ethylene butene copolymer. The amount of comonomer incorporated can be from 0.5 to 12 mol %, in some cases from 1.5 to 10 mole %, and in other cases from 2 to 8 mole % relative to ethylene.

The LLDPE component preferably has a density of 0.912 to 0.927 g/cm$^3$, more preferably from 0.913 to 0.926 g/cm$^3$, more preferably from 0.915 to 0.925 g/cm$^3$ and an MI from 0.2 to 10 g/min, preferably from 0.5 to 5.0 g/min., and is a copolymer of ethylene and a $C_{4-8}$ α-olefin, where the α-olefin is present in an amount sufficient to reduce the polyethylene density to the desired level, typically in an amount from about 2 wt % to about 12 wt %.

The LLDPE is produced in a single-stage or multi-stage process using a single-site catalyst, particularly a metallocene-based catalyst. Examples of LLDPE's produced in a single-state or multi-stage process using a single-site catalyst, particularly a metallocene-based catalyst are described in U.S. Pat. No. 6,194,527; U.S. Pat. No. 6,255,415;

A metallocene based-catalyst includes:

a) a metallocene compound;

b) at least an alumoxane or a compound able to form an alkylmetallocene cation; and c) optionally an organo aluminum compound.

Alumoxanes used as component b) in the catalyst system according to the present invention can be obtained by reacting water with an organo-aluminium compound c) of formula $H_jAlU_{3-j}$ or $H_jAl_2U_{6-j}$, where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The alumoxanes used in the catalyst system according to the invention are considered to be linear, branched or cyclic compounds containing at least one group of the type:

wherein the substituents U, same or different, are defined above.

In particular, alumoxanes of the formula:

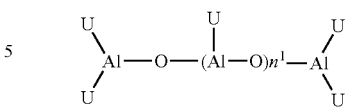

can be used in the case of linear compounds, wherein $n^1$ is 0 or an integer of from 1 to 40 and the substituents U are defined as above; or alumoxanes of the formula:

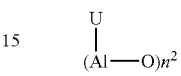

can be used in the case of cyclic compounds, wherein $n^2$ is an integer from 2 to 40 and the U substituents are defined as above.

Examples of alumoxanes suitable for use according to the present disclosure are methylalumoxane (MAO), tetra-(isobutyl)alumoxane (TIBAO), tetra-(2,4,4-trimethylpentyl) alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are:

tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl) aluminium, tris(2-ethyl-3-methyl-butyl)aluminium, tris(2-ethyl-3-methyl-pentyl)aluminium, tris(2,3-diethyl-pentyl) aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl) aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl] aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl] aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBA), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion E is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N-Dimethylaniliniumtetrakis(pentafluorophenyl)borate.

Organic aluminum compounds used as compound c) are those of formula $H_jAlU_{3-j}$ or $H_jAl_2U_{6-j}$ as described above.

The catalysts of the present invention can also be supported on an inert carrier. This is achieved by depositing the metallocene compound a) or the product of the reaction thereof with the component b), or the component b) and then the metallocene compound a) on an inert support.

Metallocene compounds are transition metal organometallic compounds containing at least one Π-ligand. Preferably they have general formula (I)

wherein $(ZR^7_m)_n$ is a divalent group bridging Cp and A; Z being C, Si, Ge, N or P, and the $R^7$ groups, equal to or different from each other, being hydrogen or a $C_1$-$C_{20}$ hydrocarbon radicals;

Cp is a substituted or unsubstituted cyclopentadienyl group, optionally condensed to one or more substituted or unsubstituted, saturated, unsaturated or aromatic rings, containing from 4 to 6 carbon atoms, optionally containing one or more heteroatoms;

A is O, S, $NR^8$, $PR^8$ wherein $R^8$ is hydrogen, or a $C_1$-$C_{20}$ hydrocarbon radicals or A has the same meaning of Cp;

M is a transition metal belonging to group 4, 5 or to the lanthanide or actinide groups of the Periodic Table of the Elements (IUPAC version);

the substituents L, equal to or different from each other, are monoanionic sigma ligands selected from the group consisting of hydrogen, halogen, $R^9$, $OR^9$, $OCOR^9$, $SR^9$, $NR^9_2$ and $PR^9_2$, wherein $R^9$ is a or a $C_1$-$C_{20}$ hydrocarbon radicals, optionally containing one or more Si or Ge atoms;;

m is 1 or 2, and more specifically it is 1 when Z is N or P, and it is 2 when Z is C, Si or Ge;

n is an integer ranging from 0 to 4;

r is 0, 1 or 2; preferably 0 or 1; n is 0 when r is 0;

p is an integer equal to the oxidation state of the metal M minus r+1; i.e. minus 3 when r=2, minus 2 when r=1, and minus 1 when r=0, and ranges from 1 to 4.

It is also possible to use mixtures of various metallocene compounds.

The comonomer of the LLDPE is preferably selected from 1-butene, 1-pentene, 1-hexene, 4-methyl-1-pentene, 1-heptene or 1-octene. More preferably, the comonomer is selected from 1-butene, 1-hexene or 1-octene. Most preferably, the comonomer is 1-butene or 1-hexene.

To enable the single-site catalysts to be used in polymerization processes in the gas phase or in suspension, it is often advantageous to use the complexes in the form of a solid, i.e. for them to be applied to a solid support. Furthermore, the supported complexes have a high productivity. The metallocene complexes can therefore also optionally be immobilized on an organic or inorganic support and be used in supported form in the polymerization. This enables, for example, deposits in the reactor to be avoided and the polymer morphology to be controlled. As support materials, preference is given to using silica gel, magnesium chloride, aluminum oxide, mesoporous materials, aluminosilicates, hydrotalcites and organic polymers such as polyethylene, polypropylene, polystyrene, polytetrafluoroethylene or polymers bearing polar functional groups, for example copolymers of ethene and acrylic esters, acrolein or vinyl acetate.

Finely divided supports can be any organic or inorganic solid. In particular, the support component can be a porous support such as talc, a sheet silicate such as montmorillonite, mica or an inorganic oxide or a finely divided polymer powder (e.g. polyolefin or a polymer having polar functional groups).

As solid support materials for catalysts for olefin polymerization, preference is given to using silica gels since particles whose size and structure make them suitable as supports for olefin polymerization can be produced from this material. Spray-dried silica gels, which are spherical agglomerates of relatively small granular particles, i.e. primary particles, have been found to be particularly useful. The silica gels can be dried and/or calcined before use.

It is also possible for the catalyst system firstly to be prepolymerized with α-olefins, preferably linear $C_2$-$C_{10}$-1-alkenes and in particular ethylene or propylene, and the resulting prepolymerized catalyst solid then to be used in the actual polymerization. The mass ratio of catalyst solid used in the prepolymerization to a monomer polymerized onto it is usually in the range from 1:0.1 to 1:1000, preferably from 1:1 to 1:200.

Exemplary commercially available LLDPE's from metallocene-based catalysts include Exceed™ 1023CA from ExxonMobil, the preparation of which is discussed also in U.S. Pat. No. 7,759,415, and Stafflex® GM1810BA from Equistar Chemicals.

LLDPE Composition

The LLDPEs employed in the films of the present disclosure have little or no long chain branching. This is evidenced by a value of the slice long chain branching index (SLCBI), determined according to the procedure outlined in U.S. Pat. No. 6,870,010, of at least 0.90 for any portion of the composition having a molecular weight of 100,000 or more. These LLDPE's exhibit improved haze reductions when blended with the LDPE used in films of the present disclosure.

U.S. Pat. No. 6,870,010 defines SLCBI according to the equation:

$$SLCBI = \frac{[\eta]_i}{[\eta]_{Linear,i}}$$

In the above equation $[\eta]_i$ is the measured intrinsic viscosity of a given retention volume slice "i" and $[\eta]_{Linear,i}$ is the intrinsic viscosity of a reference, linear polymer without long chain branching, at the same retention volume slice "i". For polymers of relatively broad molecular weight distribution (Mz/Mw greater than about 2.5) the above equation works satisfactorily with the following reference choice:

$$[\eta]_{Linear,i} = kM_i^\alpha$$

where $M_i$ is the measured molecular weight at retention volume slice "i" and k,α are the Mark-Houwink coefficients (k=3.75E-4 and α=0.728, as measured in our laboratory). For polymers of very narrow molecular weight distribution (Mz/Mw less than about 2.5), such as metallocene-catalyzed polyethylenes, the above reference choice produces unrealistic SLCBI values, at least partly due to the axial dispersion effect in gel permeation chromatography (GPC) of narrow molecular weight distribution polymers. Therefore, for metallocene-catalyzed polyethylenes, the reference polymer chosen was Exceed 1018CA, commercially available from ExxonMobil and used in U.S. Pat. No. 6,870,010 as a reference polymer with SLCBI=1.

When the LLDPE is produced with a metallocene single-site catalyst, the composition distribution breadth index (CDBI) is from 65 to 85. CDBI is described in WO 93/03093, and is defined as the percent by weight or mass fraction of the copolymer molecules having a comonomer content of ±50% of the mean molar total comonomer content, i.e., the percentage of comonomer molecules whose comonomer content is within ±50% of the average (median) comonomer content. This is determined by temperature rising elution fraction (TREF) analysis (Wild et al. J. Poly. Sci., Poly. Phys. Ed. Vol. 20, (1982), 441).

When the LLDPE is produced with a metallocene single-site catalyst, the rheological polydispersity (ER) is less than 0.4, preferably less than 0.25. Rheological polydispersity (ER) is obtained from rheological measurements performed on molten resins and is influenced by the type and amount of long chain branching and by the breadth of the molecular weight distribution. "ER" is one of the art-recognized measures of rheological polydispersity. ER is determined from plots of storage modulus (G') versus loss modulus (G") and is a measure of high-molecular-weight-end polydispersity. ER is conveniently determined as discussed in R. Shroff and H. Mpyridis, "New Measures of Polydispersity from Rheological Data on Polymer Melts," J. Applied Polymer Science 57 (1995) 1605. See also U.S. Pat. Nos. 7,238,754, 6,171,993 and 5,534,472, the teachings of which are incorporated herein by reference.

When the LLDPE is produced with a metallocene single-site catalyst, the xylene solubles are less than 1.5 wt %, preferably less than 1.0 wt %. The xylene solubles are measured by the following procedure. Two grams of LLDPE sample is placed in 200 ml of o-xylene. The solution is refluxed and stirred until the sample is fully dissolved. The solution is then cooled to 25° C. in a water-bath for 30 minutes for the polymer to precipitate. The solution is filtered and dried. The percent (wt %) of xylene solubles are calculated by dividing the weight of the dried sample by the total weight of the LLDPE sample.

(3) Blended Composition

The blended composition contains LDPE in an amount from 0.05 to 1.5 wt %, alternatively from 0.1 to 1.2 wt %, alternatively from 0.15 to 0.8 wt %, alternatively from 0.3 wt % to 0.6 wt %, and alternatively about 0.5 wt % based on the weight of LDPE and LLDPE in the composition. Additionally, LLDPE is contained in the amount of from 99.95 wt % to 98.5 wt %, alternatively from 99.9 wt % to 98.8 wt %, alternatively from 99.85 wt % to 99.2 wt %, and alternatively 99.7 wt % to 99.5 wt % based on the weight of LDPE and LLDPE in the composition which add to 100%. The compositions used in the films preferably have an SLCBI of at least 0.90.

In general, the blended composition contains less than 2.0 wt % of xylene solubles. In some examples, the xylene solubles comprise less than 1.5 wt % of the blended composition. In more specific examples, the xylene solubles comprise less than 0.5 wt % of the blended composition. In general, the xylene solubles comprise between 0.05 to 2.0 wt % of the blended composition. In particular examples, the xylene solubes comprise between 0.1 to 1.2 wt % of the blended composition.

Molecular weight and molecular weight distribution can be measured by gel permeation chromatography (GPC). Alternatively, the molecular weight and molecular weight distribution can be indicated by melt indices. Melt index ($MI_2$) is usually used to measure the molecular weight and melt flow ratio (MFR) to measure the molecular weight distribution. A larger $MI_2$ indicates a lower molecular weight. A larger MFR indicates a broader molecular weight distribution. MFR is the ratio of the high-load melt index (HLMI) to $MI_2$. The $MI_2$ and HLMI can be measured according to ASTM D-1238. The $MI_2$ is measured at 190° C. under 2.16 kg pressure. The HLMI is measured at 190° C. under 21.6 kg pressure. The blended composition has a MFR of less than 20 and preferably from about 0.01 to about 20.

When the LLDPE is produced with a metallocene single-site catalyst, the rheological polydispersity (ER) is less than 0.4, preferably less than 0.25. When the LLDPE is produced with a metallocene hybrid catalyst, the rheological polydispersity (ER) is less than 0.5. Rheological polydispersity (ER) is obtained from rheological measurements performed on molten resins and is influenced by the type and amount of long chain branching and by the breadth of the molecular weight distribution. "ER" is one of the art-recognized measures of rheological polydispersity. ER is determined from plots of storage modulus (G') versus loss modulus (G") and is a measure of high-molecular-weight-end polydispersity. ER is conveniently determined as discussed in R. Shroff and H. Mavridis, "New Measures of Polydispersity from Rheological Data on Polymer Melts," J. Applied Polymer Science 57 (1995) 1605. See also U.S. Pat. Nos. 7,238,754, 6,171,993 and 5,534,472, the teachings of which are incorporated herein by reference. The blended composition has an ER of less than 0.25. In some examples, the blended composition has an ER of 0.001 to 0.25.

Anti-block agents are added to the compositions or films to reduce the degree of blocking. Such agents include for example talc, diatomaceous earth, synthetic amorphous silicon dioxide (precipitated), nepheline syenite, clay, pumice, mica, zeolites, microcrystalline silica, aluminum oxide, zinc oxide, calcium sulfate, barium sulfate, magnesium carbonate, silicone polymer, cross-linked polymethacrylate resin, magnesium 12-hydroxyoctadecanoate, behenamide, and mixtures thereof. The anti-block agents are added to reduce the blocking of the films to a sufficient level depending on the application. Accordingly, the anti-block agents are added from 0.05 to 1 wt %, alternatively from 0.1 to 0.7 wt %, alternatively from 0.2 to 0.6 wt %, alternatively from 0.4 to 0.5 wt % based on the weight of LDPE and LLDPE in the composition.

Slip additives are optionally employed, and include erucamide, behenamide, oleyl palmitamide, stearyl erucamide, ethylene bis-stereamide, stereamide, calcium stearate, low viscosity polydimethylsiloxane, UHMW siloxane, N,N' Ethylene bisstearamide, silicone polymer, PTFE, and mixtures thereof. When added, the slip additives are provided from 0.01 to 0.5 wt %, alternatively from 0.03 to 0.3 wt %, alternatively from 0.05 to 0.2 wt %, and alternatively from 0.08 to 0.15 wt % and alternatively from 0.1 to 0.12 based on the weight of LDPE and LLDPE in the composition.

The blend composition can include other additives, preferably selected from stabilizers, UV absorbers, metal deactivators, thiosynergists, peroxide scavengers, basic co-stabilizers, acid scavengers, nucleating agents, clarifiers, conventional fillers, dispersing agents, plasticizers, lubricants, emulsifiers, pigments, optical brighteners, flame-proofing agents, antistatic agents, blowing agents, and mixtures thereof.

In some embodiments, the film can comprise or consist essentially of a blend of the following components:
(a) from 0.1 wt % to 1 wt % of an LDPE;
(b) from 99.8 wt % to 98.15 wt % of an LLDPE;
(c) from 0.1 wt % to 0.7 wt % one or more anti-block additives,
(d) from 0.0 wt % to 0.15 wt % one or more slip agents based on weight percent of the total composition.

In some embodiments, the film can comprise or consist essentially of a blend of the following components:
(a) from 0.1 wt % to 1 wt % of an LDPE;
(b) from 99.75 wt % to 98.15 wt % of an LLDPE;
(c) from 0.1 wt % to 0.7 wt % one or more anti-block additives,
(d) from 0.05 wt % to 0.15 wt % one or more slip agents based on weight percent of the total composition.

In some embodiments, the film can comprise or consist essentially of a blend of the following components:
(a) from 0.3 wt % to 0.7 wt % of an LDPE;
(b) from 99.42 wt % to 98.58 wt % of an LLDPE;
(c) from 0.2 wt % to 0.6 wt % one or more anti-block additives,
(d) from 0.08 wt % to 0.12 wt % one or more slip agents based on weight percent of the total composition.

In some embodiments, the film can comprise or consist essentially of a blend of the following components:
(a) from 0.3 wt % to 0.5 wt % of an LDPE;
(b) from 99.3 wt % to 98.7 wt % of an LLDPE;
(c) from 0.3 wt % to 0.6 wt % one or more anti-block additives,
(d) from 0.1 wt % to 0.2 wt % one or more slip agents based on weight percent of the total composition.

For the above composition, all ranges disclosed herein are intended to include any combination of the mentioned upper and lower limits even if the particular combination and range is not specifically listed. Additionally, it will be understood by those of skill in the art that the ranges provided above for LDPE, LLDPE, anti-block agents and slip additives include also all ranges between any combination of the specified weight percentages. It would be understood by those of skill in the art how to the amounts of each component to be within the specified ranges.

The blends are preferably prepared by melt-blending the LDPE with the LLDPE before film extrusion to form a blend extrudate and then feeding the extrudate to the film extruder. For example, the LDPE can be melt-extruded into the LLDPE along with other additives during the finishing and pelletization step in the LLDPE production or post-LLDPE production, such as in a Banbury mixer, twin screw extruder or similar equipment known to those skilled in the art. Blending the components in such a way provides improved performance over dry-blending the components together during film extrusion, e.g., in the feed to the film extruder processing the blend. The anti-blocking agents and slip additives can be added before or during the formation of the extrudate.

In this specification, the term "film" shall mean a single layer or multiple layers of the blend, each layer having a thickness of from 0.1 to 10 mils. Preferably, each layer has a thickness of 0.1 to 2 mils. The films can be of any type prepared by processes well known to those skilled in the art, such as cast, blown-air, blown-water, oriented, and biaxially oriented. The films may also be used in extrusion coating and extrusion lamination processes. When the films are coextruded, they can be produced using conventional methods and extrusion equipment well known to those skilled in the art, where layers of polymer melts are combined by introducing multiple polymer melt streams into a combining block/manifold or die which then directs the melt streams to flow together (while still in the block/manifold or die), then exiting the die together as a single flow stream. Alternately, multiple polymer melt streams can be introduced into a die and then combined just after exiting the die.

For bread bag and sandwich bag applications, the thickness can be from 0.75 to 1.7 mil, alternatively from 0.90 to 1.25 mil, alternatively about 1 mil. For zipper bag applications, the film is generally thicker, from 1.50 mil to 2.50 mil, or alternatively from 1.90 mil to 2.25 mil.

Preferably, the films are blown or cast films. More preferably, the films are blown films.

(4) Film Properties

The films prepared according to the disclosure herein have particular suitability as bags, food bags, bread bags, and zipper bags. However the films disclosed herein are also particularly suitable for any application where surfaces of the films are in contact with one another and which are intended to be pulled apart as a normal part of its use and where transparency of the bag is desirable. Thus any type of bag or application with adjacent contacting surface layers can employ the films disclosed herein. Particularly suitable use is for bread bags and sandwich bags. These are generally smaller transparent bags to hold sandwiches or sliced breads. Such bags disclosed herein are from 0.70 to 1.70 mil, alternatively from 0.9 to 1.25 mil, alternatively about 1 mil in thickness. Additionally, particular suitable use is for zipper bags. Zipper bags are generally thicker from 1.50 to 2.50 mil in thickness, alternatively from 1.75 to 2.25 mil. Zipper bags include those bags having an interlocking portion near the perimeter of the opening of the bag. When interlocked, such bags form a tight seal. The interlocking can include one or more projections and corresponding groove(s) running along the length of the opening, which forms a seal when the projection is inserted into the groove. Additionally, a "lock" can be employed which includes a device attached to the opening of the bag which can be moved along the length pressing the projection into the groove to facilitate locking. These can be referred to as zipper locking bags.

The LDPE and metallocene produced LLDPE blended compositions have high clarity and strength. However, films formed from such blends may have blocking in excess of 100 g/16 in$^2$ and thus would be unsuitable for bag applications, as they would be difficult to open by consumers. Accordingly, anti-block is added to reduce the blocking within an acceptable range. However, anti-block additives have a tendency to reduce clarity and increase haze of films added thereto.

Surprisingly, the films disclosed herein are able to have exceptional clarity, strength and blocking properties even after the addition of anti-block additives. Accordingly, in commercial environment, the films disclosed herein provide significant improvement over conventional bag films.

Film blocking is measured according to ASTM D3354. Blocking refers to the ease with which bags are opened (i.e. openability), when formed into, for example, bags. For testing, specimens are conditioned prior to measurement for 24 hours at 60° C. under a weight resulting in a contact pressure of 1 psi. The specimens are cut from the collapsed blown film bubble such that the contacting film surfaces are "inside-to-inside." "Inside" as well as "outside" is used herein with reference to the bubble surface. "Inside-to-inside" typically represents the maximum likelihood of blocking in blown film. Preferably, for 1-mil films the blocking is within the range of about 40 g/16 in$^2$ or less, alternatively about 35 g/16 in$^2$ or less, alternatively about 30 g/16 in$^2$ or less, alternatively about 25 g/16 in$^2$ or less, alternatively about 20 g/16 in$^2$ or less, alternatively about 15 g/16 in$^2$, or less alternatively about 10 g/16 in$^2$ or less. The blocking can range from 5 to 40 g/16 in$^2$, or alternatively from 6 to 30 g/16 in$^2$ The same ranges apply for films of up to 2.25 and 2.50 mil.

Clarity of the films can be measured with narrow angle scattering (NAS) according to ASTM D1746, and have an NAS for 1-mil films of at least 35% or more, alternatively at least 40% or more, alternatively at least 45% or more, alternatively at least 50% or more. The NAS can range from 40% to 60%, alternatively from 45% to 55%, alternatively from 45% to 50%. The same ranges apply for films of up to 2.25 and 2.50 mil.

Furthermore, one of the measurements for the strength of the films include Dart drop impact measured according to ASTM method D1709. Accordingly, 1-mil films, and films up to 2.25 mil or 2.50 mil, have a dart drop impact of at least 100 g or more, alternatively of at least 120 g or more, alternatively at least 130 g or more. Dart drop impact can range from 100 to 800 g, alternatively from 120 to 700 g, alternatively from 130 to 660 g. Specifically when LLDPE's are employed in the composition with densities are from 0.912 g/cm$^3$ to 0.922 g/cm$^3$, the drop dart impact can be at least 500 g or more, alternatively at least 600 g or more, alternatively greater than 650 g or more. In such cases the Dart drop impact can range from 600 g to 800 g, and alternatively from 650 to 700 grams.

Film stiffness (1% secant modulus) is measured according to ASTM E111 and in the machine direction (MD) and transverse direction (TD). 1-mil films have a stiffness of (1% secant modulus (MD)) 25,000 psi or more, alternatively 30,000 psi or more, alternatively 35,000 psi or more, and alternatively 38,000 psi or more. Accordingly, the stiffness can (1% secant modulus (MD)) of 25,000 psi to 40,000 psi, alternatively from 28,000 psi to 39,000 psi, alternatively from 29,000 psi to 38,500 psi. The same ranges apply for films of up to 2.25 and 2.50 mil.

With respect to compositions wherein the LLDPE has a density of from 0.912 g/cm$^3$ to 0.922 g/cm$^3$, 1-mil films have a stiffness of (1% secant modulus (MD)) 25,000 to 31,000 psi, alternatively from 27,000 to 30,000 psi. When the LLDPE has a density from 0.922 g/cm$^3$ to 0.927 g/cm$^3$, alternatively from 0.923 g/cm$^3$ to 0.925 g/cm$^3$, the stiffness (1% secant modulus (MD)) will be higher, namely from 35,000 to 41,000 psi, alternatively from 37,000 to 40,000 psi for films of 1 mil, and up to 2.25 and 2.50 mil. Such higher levels of stiffness also allow for thinner films to be employed. Accordingly, when the LLDPE has a density from 0.922 g/cm$^3$ to 0.927 g/cm$^3$, alternatively from 0.923 g/cm$^3$ to 0.925 g/cm$^3$, the film thickness can be less than 1.0 mil, alternatively 0.80 mil or less, alternatively from 0.75 mil or less, alternatively from 0.70 mil or less, alternatively from 0.60 mil or less, while still maintaining acceptable properties. Additionally, for this higher density LLDPE the film thickness includes ranges from 0.70 to 1.0 mil, alternatively from 0.75 to 0.90 mil, alternatively from 0.75 to 0.85 mil.

When the LLDPE has a density of 0.912 g/cm$^3$ to 0.922 g/cm$^3$, alternatively from 0.915 g/cm$^3$ to 0.921 g/cm$^3$ films can be from 0.90 to 1.70 mil, alternatively from 0.90 to 1.25 mil, or alternatively the films can be from 0.90 mil or more, alternatively from 1 mil or more.

Tensile properties (tensile stress at yield) are measured according to ASTM D882, respectively. For films of 1 mil, and up to 2.25 and 2.50 mil, in the machine direction (MD) and the transverse direction (TD), the tensile strength can be from 1000 to 2200 g, alternatively from 1200 to 2100 g, alternatively from 1300 to 2000 grams. With respect to compositions wherein the LLDPE has a density of from 0.912 g/cm$^3$ to 0.922 g/cm$^3$, the tensile strength at yield for MD and TD can be from 900 to 1600 grams, alternatively from 1000 to 1500 grams, alternatively from 1200-1400 grams. When the LLDPE has a density from 0.922 g/cm$^3$ to 0.927 g/cm$^3$, alternatively from 0.923 g/cm$^3$ to 0.925 g/cm$^3$, the tensile strength at yield for MD and TD can be from 1500 to 2500 grams, alternatively from 1700 to 2200 grams, alternatively from 1800 to 2000 grams.

Haze is determined in accordance with ASTM D1003. For films of 1 mil, and up to 2.25 and 2.50 mil, haze is 15% or less, 12% or less, alternatively 10% or less, alternatively 9% or less. Haze can range from 7 to 15%, and alternatively from 8 to 12%.

Elmendorf tear strength is measured according to ASTM 1922. For 1 mil films, the tear strength in the machine direction (MD) is from about 180 grams to about 300 grams, alternatively from about 200 grams to about 250 grams, alternatively from about 210 grams to about 230 grams. In the transverse direction (TD), the tear strength is from about 240 grams to about 450 grams, alternatively from about 280 grams to about 420 grams, and alternatively from about 300 grams to about 415 grams. For thicker films, such as from 1.50 mil to 2.50 mil, or alternatively from 1.9 mil to 2.25 mil where the LLDPE has a density of from 0.922 $g/cm^3$ to 0.927 $g/cm^3$, alternatively from 0.923 $g/cm^3$ to 0.925 $g/cm^3$, the tear strengths in the MD and TD directions are from about 600 grams to 900 grams, alternatively from 700 grams to 850 grams, alternatively from 740 grams to 850 grams.

Gloss is disclosed herein are measured according to ASTM D2457. The Coefficient of friction is measured according to ASTM D1894.

Densities disclosed throughout the present disclosure are measured according to ASTM D1505 and the density specimens are prepared with the annealed extrudate method (melt index strand annealed in boiling water for 30 minutes and then cooled under ambient conditions for 20 minutes, prior to the density measurement). The densities herein are "base resin densities" and is understood to be the resin density without additives, such as antiblock additives that would change the density. The presence of such additives can be detected via the ash test (according to ASTM D5630). If the base resin density is not known, it can be estimated from the following relation:

base resin density=(annealed extrudate density)−(ppm ash)*7E-7

The present subject matter being thus described, it will be apparent that the same may be modified or varied in many ways. Such modifications and variations are not to be regarded as a departure from the spirit and scope of the present subject matter, and all such modifications and variations are intended to be included within the scope of the present disclosure.

Examples

The following examples are provided to illustrate the polymer blends and films of the present disclosure, and are not intended to be, nor should they be construed as limiting the scope of the disclosure provided herein.

Blends of the examples were prepared using the following LDPE, LLDPE and additive components:

LDPE-1 LDPE having a density of 0.920 $g/cm^3$ and an MI of 0.18 dg/min., commercially available from Equistar Chemicals, LP having the tradename Petrothene® NA942000.

LDPE-2 LDPE having a density of 0.929 $g/cm^3$, an MI of 3.0 dg/min., 1600 ppm of anti-block, and 1500 ppm of erucamide as a slip additive, commercially available from Equistar Chemicals, LP having the tradename Petrothene® NA283245X02.

LDPE-3 LDPE having a density of 0.924 $g/cm^3$, an MI of 3.0 dg/min., 1600 ppm of anti-block, and 1500 ppm of erucamide as a slip additive, commercially available from Westlake Chemical having the tradename EF4060.

LDPE-4 LDPE having a density of 0.924 $g/cm^3$, an MI of 2.3 dg/min., no anti-block or slip additives, commercially available from Equistar Chemicals, LP having the tradename Petrothene® NA155000.

LLDPE-1 $C_6$-LLDPE having a density of 0.918 $g/cm^3$ and an MI of 1.0 dg/min, a CDBI of 70, xylene solubles of 0.9 wt %, MFR of 16, and a rheological polydispersity (ER) of 0.14, produced using a metallocene catalyst in a Unipol gas-phase process, commercially available from Equistar Chemicals, LP having the tradename Stafflex® GM1810BA. The SLCBI is shown in FIG. 1.

LLDPE-2 $C_6$-LLDPE having a density of 0.923 $g/cm^3$, an MI of 1.0 dg/min, CDBI of 77, xylene solubles of 0.3 wt %, MFR or 16, and a rheological polydispersity (ER) of 0.17, produced using a metallocene catalyst, commercially available from ExxonMobil having the tradename Exceed™ 1023CA. The SLCBI is shown in FIG. 1

LLDPE-3 $C_6$-LLDPE having a density of 0.918 $g/cm^3$, an MI of 1.0 dg/min, CDBI of 50, xylene solubles of 13.4 wt %, MFR of 28 and a rheological polydispersity (ER) of 0.72, produced using the Ziegler Natta catalyst in a Unipol gas-phase process, commercially available from Equistar Chemicals, LP having the tradename Petrothene® GA601030. The SLCBI is shown in FIG. 1

LLDPE-4 $C_4$-LLDPE having a density of 0.938 $g/cm^3$, an MI of 3.3 dg/min, 6000 ppm of silica anti-block, and 1600 ppm of erucamide as a slip additive, commercially available from ExxonMobil having the tradename LL1433.82

Adt-1 Talc antiblock additive (Optibloc™ 10), commercially available from Specialty Minerals.

Adt-2 Slip additive (erucamide) commercially available from Croda.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

In the following examples, unless otherwise specified, all blown films were produced in an LLDPE blown film line equipped with a 2" diameter smooth-bore extruder, 24:1 L/D barrier screw with a Maddock mixing section. The smooth bore extruder was equipped with a 4" diameter die and 0.060" die gap. Operating conditions included an output rate of 63 lb/hr, a blow-up-ratio of 2.5:1, a 12" frostline height, and melt temperature of approximately 225° C.

Example 1

A blend containing 99.0 wt % LLDPE-1, 0.5 wt % LDPE-1, 0.4 wt % Adt-1 and 0.1 wt % Adt-2 and film were prepared by processing the blend components in a ZSK-30 twin-screw extruder to form an extrudate. A 1.0 mil blown film was then prepared from the extrudate.

Comparative Example 2

A 1.0 mil film containing 100% LDPE-2 was prepared on a cast film line equipped with a 2.5" diameter smooth-bore extruder and a 24:1 L/D barrier screw with a Maddock mixing section. The cast line die was 41" across with a 0.030" die gap.

Operating conditions included an output rate of 93 lb/hr and a melt temperature of approximately 263° C.

Comparative Example 3

A 1.0 mil film containing 100% LDPE-3 was prepared on a cast film line in a similar manner as described for Comparative Example 2.

Example 4

A blend containing 99.0 wt % LLDPE-2, 0.5 wt % LDPE-1, 0.4 wt % Adt-1 and 0.1 wt % Adt-2 and film were prepared by processing the blend components in a ZSK-30 twin-screw extruder to form an extrudate. A 1.0 mil blown film was then prepared from the extrudate.

Example 5

A blend containing 99.0 wt % LLDPE-2, 0.5 wt % LDPE-1, 0.4 wt % Adt-1 and 0.1 wt % Adt-2 and film were prepared by processing the blend components in a ZSK-30 twin-screw extruder to form an extrudate. A 0.75 mil blown film was then prepared from the extrudate.

Figure 2:
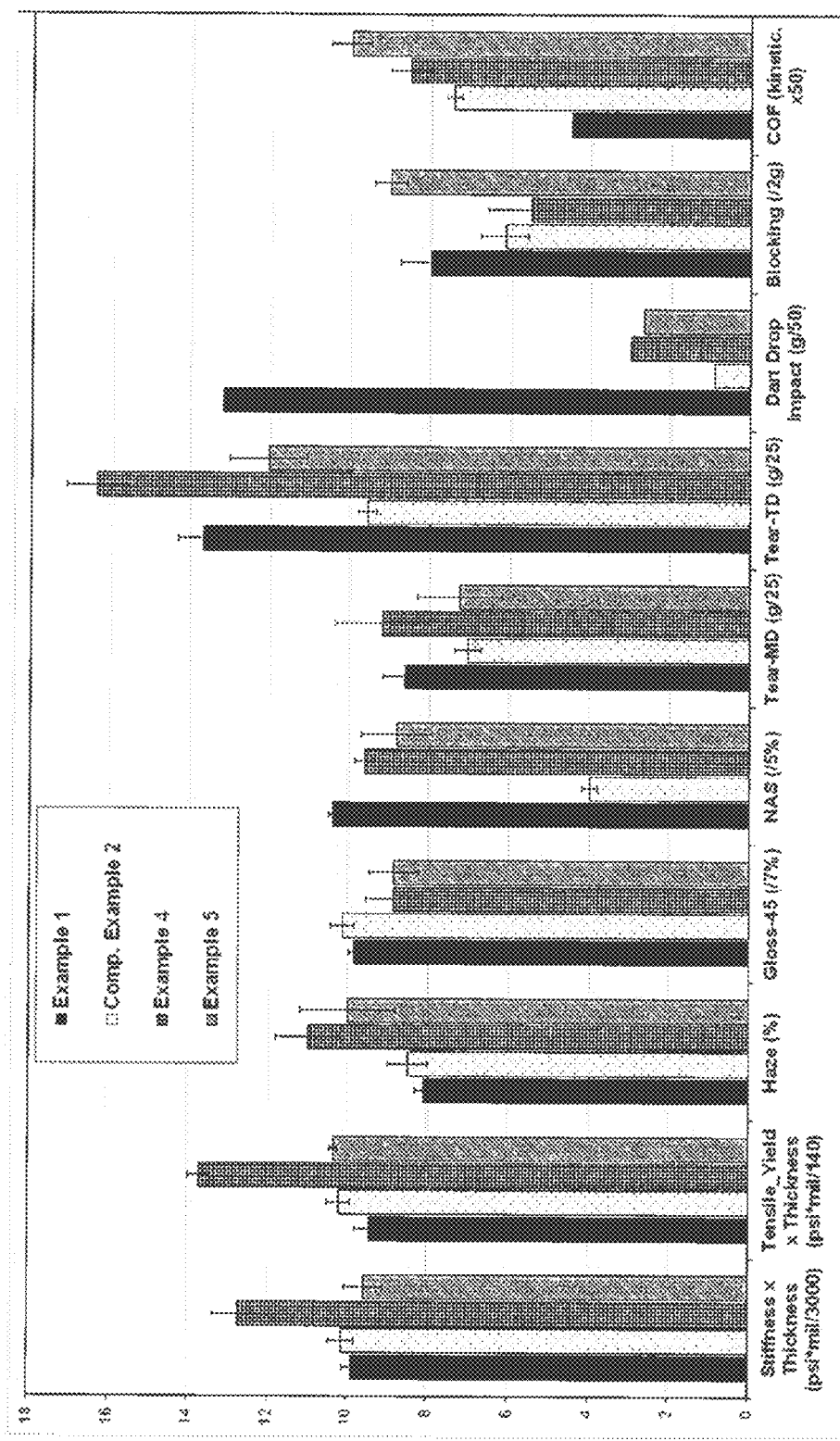
FIG. 2 shows a graph that illustrates properties obtained for particular exemplary and comparative examples.

The films of Examples 1, 4, 5 and comparative examples 2 and 3 are tested regarding various properties as shown in Table 1. FIG. 2 is also provided which illustrate examples 1, 4 and 5 and comparative example 2 of Table 1 in graphic form.

TABLE 1

| Properties | Ex. 1 | Comp. Ex. 2 | Comp. Ex. 3 | Ex. 4 | Ex. 5 |
|---|---|---|---|---|---|
| Blocking, g/16 in$^2$ | 16 | 12 | 25 | 11 | 18 |
| Stiffness 1% Secant Mod (MD) (psi) | 29600 | 30400 | 26500 | 38200 | 38300 |
| Stiffness 1% Secant Mod (TD) (psi) | 31800 | 33700 | 28500 | 41900 | 41500 |
| NAS (%) | 52 | 20 | 23 | 48 | 44 |
| Dart Drop Impact (g) | 660 | 45 | 48 | 151 | 134 |
| Gloss (%) | 69 | 71 | 77 | 62 | 62 |
| Tear-MD (g) | 215 | 176 | 118 | 230 | 181 |
| Tear-TD (g) | 342 | 239 | 231 | 409 | 301 |
| COF-kinetic | 0.09 | 0.15 | 0.14 | 0.17 | 0.20 |
| Tensile Strength (yield) – MD (g) | 1320 | 1430 | 1330 | 1920 | 1932 |
| Tensile Strength-TD (g) | 1340 | 1440 | 1270 | 1955 | 1986 |
| Haze % | 8.1 | 8.5 | 7.3 | 11 | 10 |

As shown in examples 1, 4, and 5 of table 1, superior properties are demonstrated relative to comp. examples. 2 and 3. The films of examples 1, 4 and 5 are formed from a polymer composition of an LLDPE made from a metallocene ("mLLDPE") and LDPE. The mLLDPE provides strength while the LDPE aids in providing clarity to the resulting film. Additionally, the mLLDPE's of examples 1, 4 and 5 have the additional benefit of not only having high strength, but clarity as well. Thus, the films formed from these compositions have excellent clarity as well as strength. On the other hand, the comparative examples 2 and 3, which comprise only an LDPE as a polymer show good clarity, but inferior strength properties.

Significantly, examples 1, 4 and 5 show very high strength properties as compared to the LDPE films of comparative examples 2 and 3, as indicated by dart drop impact, tear strength, and tensile strength. In particular, dart drop impact strength is substantially improved, with example 1 showing a value of 660 g, while comp. exs. 2 and 3 only have 45 g and 48 g. Tear strength, and tensile strength are also both increased over the LDPE films of comparative examples 1 and 2.

Moreover, while having improved strength properties, the clarity (as quantified by NAS) of the mLLDPE/LDPE films of examples 1, 4 and 5 are also significantly improved. For example, the NAS showed significant improvement having more than twice the value of the films in comparative examples 2 and 3.

The blocking and haze values are also within acceptable ranges for food bags and bread bags. Accordingly, with the improved strength and clarity of the films, they can be used for a wide range of applications, with exceptional properties for bags, food bags and bread bags.

Moreover, examples 4 and 5 demonstrate that an mLLDPE having a higher density can be employed to produce thinner films, thus leading to material savings. In particular, the mLLDPE employed in examples 4 and 5 has a density of 0.923 g/cm$^3$. As a result, these films have a stiffness (MD) of over 35,000 psi. Thus, the film in example 5 having a thickness of 0.75 mils shows a tensile load at yield of 0.75×1932=1,450 lb/in, compared to 1,430 lb/in for Comparative Example 2 and 1,330 lb/in for Comparative Example 3, both at 1.0 mil. Thus, the film of example 5 not only results in 25% material savings versus Comp. Examples 2-3, but it also offers better impact strength and clarity (NAS).

Example 6

A film made up of 100% LLDPE-1 was prepared by processing the blend components in a ZSK-30 twin-screw extruder to form an extrudate. A 1.0 mil blown film was then prepared from the extrudate.

Example 7

A blend containing 99.5 wt % LLDPE-1 and 0.5 wt % LDPE-1, and film were prepared by processing the blend components in a ZSK-30 twin-screw extruder to form an extrudate. A 1.0 mil blown film was then prepared from the extrudate.

Example 8

A blend containing 99.5 wt % LLDPE-1, 0.4 wt % Adt-1 and 0.1 wt % Adt-2 and film were prepared by processing the blend components in a ZSK-30 twin-screw extruder to form an extrudate. A 1.0 mil blown film was then prepared from the extrudate.

TABLE 2

| Properties | Ex. 6 | Ex. 7 | Ex. 8 |
|---|---|---|---|
| Blocking, g/16 in$^2$ | 107 | 142 | 7 |
| Stiffness 1% Secant Mod (MD) (psi) | 28200 | 27144 | 28000 |
| Stiffness 1% Secant Mod (TD) (psi) | 29800 | 28450 | 29200 |
| NAS (%) | 69 | 84 | 38 |
| Dart Drop Impact (g) | 830 | 810 | 510 |
| Gloss (%) | 49 | 80 | 46 |
| Tear-MD (g) | 247 | 228 | 228 |
| Tear-TD (g) | 334 | 341 | 336 |

TABLE 2-continued

| Properties | Ex. 6 | Ex. 7 | Ex. 8 |
|---|---|---|---|
| Tensile Strength (yield) – MD (g) | 1340 | 1370 | 1310 |
| Tensile Strength-(yield) – TD (g) | 1360 | 1370 | 1290 |
| Haze % | 13 | 4.3 | 16 |

As shown in example 7 of Table 2, a film made up solely of LLDPE-1 has very good tensile strength and impact properties. Even with the addition of LDPE-1 as shown in example 6, these strength properties are maintained. The addition of LDPE-1 has the effect of decreasing the film haze. However, with both examples 6 and 7, the blocking remains too high for food bag or bread bag applications. With the addition of anti-block and slip agents together with LLDPE-1, as shown in example 8, the blocking is significantly decreased, however the haze is increased to 16%.

Accordingly, the combination of a LLDPE-1 with an LDPE and appropriate anti-block and slip agents as shown in Example 1, brings together all of these beneficial properties and results in a polymer combination which produces significantly improved films for food bag or bread bag applications.

Example 9

A film made up of 100% LLDPE-2 was prepared by processing the blend components in a ZSK-30 twin-screw extruder to form an extrudate. A 1.0 mil blown film was then prepared from the extrudate.

Example 10

A film made up of 100% LLDPE-2 was prepared by processing the blend components in a ZSK-30 twin-screw extruder to form an extrudate. A 0.75 mil blown film was then prepared from the extrudate.

TABLE 3

| Properties | Ex. 9 | Ex. 10 |
|---|---|---|
| Blocking, g/16 in$^2$ | 28 | 24 |
| Stiffness 1% Secant Mod (MD) (psi) | 38,000 | 34,500 |
| Stiffness 1% Secant Mod (TD) (psi) | 37,500 | 41,600 |
| NAS (%) | 56 | 54 |
| Dart Drop Impact (g) | 148 | 128 |
| Gloss (%) | 45 | 49 |
| Tear-MD (g) | 283 | 170 |
| Tear-TD (g) | 398 | 316 |
| Tensile Strength (yield) – MD (g) | 1950 | 1870 |
| Tensile Strength-(yield) – TD (g) | 1950 | 2020 |
| Haze % | 18 | 13 |

Examples 9 and 10 illustrate the properties of films formed solely from LLDPE-2. With comparison to examples 4 and 5, the addition of an LDPE along with anti-block and slip agents has the effect of decreasing haze and coefficient-of-friction to acceptable levels.

Comparative Example 11

LLDPE-3 was processed in a blown film line to form a blown film of 1.0 mil thickness. The standard blown film fabrication conditions were used, except that the blown film die gap was 0.100".

Comparative Example 12

A blend containing 99.5 wt % LLDPE-3 and 0.5 wt % LDPE-1 was prepared by melt-extruding the components in a ZSK-30 twin-screw extruder to form an extrudate. A blown film of 1.0 mil thickness was then prepared from the extrudate, similarly to Comparative Example 11.

TABLE 4

| Properties | Comp. Ex. 11 | Comp. Ex. 12 |
|---|---|---|
| Haze, % | 10 | 9.4 |
| Gloss-45, % | 52 | 57 |
| Clarity (NAS), % | 74 | 76 |
| Dart Drop Impact, g/mil | 169 | 161 |
| MD-Tear, g/mil | 360 | 327 |
| Haze$_{blend}$/Haze$_{lldpe}$ | | 0.94 |
| DI$_{blend}$/DI$_{lldpe}$ | | 0.95 |
| MDT$_{blend}$/MDT$_{lldpe}$ | | 0.91 |

As shown in comparative examples 11 and 12 in table 4, the addition of LDPE to LLDPE-3 has no effect on its properties with respect to haze, gloss or clarity. This is in contrast to metallocene LLDPE's such as LLDPE-1 and LLDPE-2 which show significant improvement in haze and gloss with the addition of and LDPE as can be seen in examples 6 and 7 in Table 2.

Comparative Example 13

A blend containing 99.5 wt % LLDPE-3, 0.65 wt % Adt-1 and 0.135 wt % Adt-2 was prepared by melt-extruding the components in a twin-screw extruder to form an extrudate. A blown film of 1.0 mil thickness was then prepared from the extrudate, similarly to Comparative Example 11.

TABLE 5

| Properties | Comp. Ex. 13 |
|---|---|
| Blocking, g/16 in$^2$ | 75 |
| Stiffness 1% Secant Mod (MD) (psi) | 32200 |
| Stiffness 1% Secant Mod (TD) (psi) | 35800 |
| NAS (%) | 14 |
| Dart Drop Impact (g) | 148 |
| Gloss (%) | 41 |
| Tear-MD (g) | 359 |
| Haze % | 19 |

Example 13 shows unacceptably high blocking and high haze for a film formed from LLDPE-3, compared to the inventive examples of Table 1.

Example 13

A blend containing 99.0 wt % LLDPE-2, 0.5 wt % LDPE-1, 0.4 wt % Adt-1 and 0.1 wt % Adt-2 and film were prepared by processing the blend components in a ZSK-30 twin-screw extruder to form an extrudate. A 2.25 mil blown film was then prepared from the extrudate.

Comparative Example 14

A 2.25 mil film containing 60% LDPE-4 and 40% LLDPE-4 was prepared on a cast film line in a similar manner as described for comparative example 2. The resin composition and film thickness of comparative example 14 is typical of films for zipper-bag applications.

Example 15

A blend containing 99.0 wt % LLDPE-2, 0.5 wt % LDPE-1, 0.4 wt % Adt-1 and 0.1 wt % Adt-2 and film were prepared by processing the blend components in a ZSK-30 twin-screw extruder to form an extrudate. A 1.9 mil blown film was then prepared from the extrudate.

The films of examples 13, 15 and comparative example 14 are tested regarding various properties as shown in Table 6.

TABLE 6

| Properties | Ex. 13 | Comp. Ex. 14 | Ex. 15 |
| --- | --- | --- | --- |
| Thickness (mils) | 2.25 | 2.25 | 1.9 |
| Blocking, g/16 in2 | 6.7 | 18 | 9.7 |
| Gloss (%) | 47 | 75 | 47 |
| Haze % | 12 | 8.5 | 12 |
| Stiffness 1% Secant Mod (MD) (psi) | 39400 | 36700 | 38100 |
| Stiffness 1% Secant Mod (TD) (psi) | 39900 | 41500 | 39300 |
| NAS (%) | 43 | 17 | 45 |
| Tear-MD (g) | 742 | 390 | 661 |
| Tear-TD (g) | 847 | 421 | 791 |
| Dart Drop Impact (g) | 377 | 83 | 302 |
| Tensile Strength (yield) – MD (g) | 1760 | 1660 | 1690 |
| Tensile Strength (yield) – TD (g) | 1780 | 1730 | 1730 |

As shown in examples 13 and 15 of table 1, superior properties are demonstrated relative to comp. example 14. Specifically, the film of example 13 provides superior see-through clarity (NAS), tear strength and dart drop impact, compared to comparative example 14, while improving film blocking and maintaining stiffness and tensile properties. Additionally, Examples 13 and 15 show that as compared to examples 4 and 5, despite increase in thickness from 1 mil and 0.75 mil, properties are maintained, with increases shown in tear strength in the TD and MD directions. Moreover, example 15 amounts to a 15% gauge reduction of example 13, showing that superior film properties are maintained despite a reduction in film gauge from 2.25 mil to 1.9 mil. Examples 13 and 15 demonstrate that significant improvement in relevant film properties, as well as film gauge reduction, is possible for zipper-bag applications.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An article comprising a film wherein the film has a narrow angle scattering (NAS) of greater than 40, a drop dart impact of greater than 100 grams, and a blocking of less than 40 g/16 in$^2$.

2. The article of claim 1, wherein the film comprises a blend of:
(a) from 0.05 to 1.5 wt % of an LDPE having an MI of 0.1 to 0.6 dg/min;
(b) from 98.5. to 99.95 wt % of an LLDPE produced with a single-site catalyst comprising a metallocene; and
(c) from 0.05 to 1 wt % one or more anti-block additives, wherein the weight percentages are based on 100 parts of (a) and (b).

3. The article of claim 2, where the LLDPE has a slice long chain branching index of at least 0.90 for any portion of the composition having a molecular weight of 100,000 or above.

4. The article of claim 2, wherein the film has a haze of about 12% or less.

5. The article of claim 2, wherein the film has a 1% secant (MD) greater than 25,000 psi.

6. The article of claim 2 wherein the LDPE is present in an amount from 0.15 to 0.8 wt % and LLDPE is present in an amount from 99.85 to 99.2 wt % based on 100 parts of (a) and (b).

7. The article of claim 2 wherein the LLDPE has a density of from 0.912 g/cm$^3$ to 0.922 g/cm$^3$.

8. The article of claim 7 wherein the LLDPE is a copolymer of ethylene and 1-butene or 1-hexene.

9. The article of claim 2 wherein the LDPE has an MI is 0.1 to 0.4 dg/min.

10. The article of claim 2 wherein the LLDPE has a density of 0.922 g/cm$^3$ to 0.927 g/cm$^3$.

11. The article of claim 10 wherein the LLDPE has a 1% secant modulus (MD) greater than 35,000 psi.

12. The article of claim 11 where in the film has a thickness of less than 1 mil.

13. The article of claim 2 wherein the film is produced by a blown film process.

14. The article of claim 2 wherein more than one film is present and forms a least one pair of adjacent contacting surface layers.

15. The article of claim 2 wherein the article is formed into a bag.

16. The article of claim 15 wherein the film has a thickness of from about 0.7 to 1.70 mil.

17. The article of claim 2 wherein the blend comprises from 0.4 to 0.5 wt % of said one or more antiblocking agents based on 100 parts of (a) and (b).

18. The article of claim 2 wherein the LDPE has an MI is 0.1 to 0.4 dg/min.

19. The article of claim 2 wherein the polymer blend comprises from 0.01 to 0.5 wt % of one or more slip agents based on 100 parts of (a) and (b).

20. The article of claim 2 wherein the article is formed into a zipper bag.

21. The article of claim 20 wherein the film has a thickness of from about 1.50 mil to 2.50 mil.

22. A process for preparing a film having a narrow angle scattering (NAS) of greater than 40, a drop dart impact of greater than 100 grams, and a blocking of less than 40 g/16 in² comprising the steps of:
preparing a blend comprising:
(a) from 0.05 to 1.5 wt % of an LDPE having an MI of 0.1 to 0.6 dg/min;
(b) from 98.5. to 99.95 wt % of an LLDPE produced with a single-site catalyst comprising a metallocene; and
(c) from 0.05 to 1 wt % one or more anti-block additives, wherein the weight percentages are based on 100 parts of (a) and (b), and
forming said blend into a film.

23. The process of claim 22, where the LLDPE has a slice long chain branching index of at least 0.90 for any portion of the composition having a molecular weight of 100,000 or above.

24. The process of claim 22 wherein the LLDPE has a density of from 0.912 g/cm³ to 0.922 g/cm³.

25. The process of claim 22 further comprising the step of forming the film into a bag.

26. The process of claim 22 wherein the LLDPE has a density of 0.922 g/cm³ to 0.927 g/cm³.

27. The process of claim 26 wherein the film has a secant modulus in the machine direction greater than 35,000 psi.

28. The process of claim 27 wherein the film has a thickness of 0.75 mil.

29. The process of claim 22 wherein the film has a thickness of from 1.50 mil to 2.50 mil.

* * * * *